US012304193B2

(12) United States Patent
Tsuchiya

(10) Patent No.: US 12,304,193 B2
(45) Date of Patent: May 20, 2025

(54) DRYING DEVICE AND IMAGE FORMING SYSTEM

(71) Applicant: KYOCERA Document Solutions Inc., Osaka (JP)

(72) Inventor: Hiroaki Tsuchiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 111 days.

(21) Appl. No.: 18/263,885

(22) PCT Filed: Feb. 3, 2022

(86) PCT No.: PCT/JP2022/004250
§ 371 (c)(1),
(2) Date: Aug. 1, 2023

(87) PCT Pub. No.: WO2022/168913
PCT Pub. Date: Aug. 11, 2022

(65) Prior Publication Data

US 2024/0300251 A1 Sep. 12, 2024

(30) Foreign Application Priority Data

Feb. 3, 2021 (JP) ................................ 2021-015757

(51) Int. Cl.
*B41J 11/00* (2006.01)
*B41J 13/08* (2006.01)
*B65H 5/22* (2006.01)

(52) U.S. Cl.
CPC ......... *B41J 11/00218* (2021.01); *B41J 13/08* (2013.01); *B65H 5/224* (2013.01);
(Continued)

(58) Field of Classification Search
CPC ....... B41J 11/20; B41J 11/0022; B41J 11/007; B41J 25/308; B41J 25/3086; B66F 7/025; B29C 64/232
See application file for complete search history.

(56) References Cited

U.S. PATENT DOCUMENTS

2003/0043246 A1* 3/2003 Codos ........................ B41J 2/01 347/102
2007/0227446 A1* 10/2007 Moon ........................ B41J 3/28 118/663

(Continued)

FOREIGN PATENT DOCUMENTS

JP 2003-170573 A 6/2003
JP 2009-214328 A 9/2009
JP 2015-080943 A 4/2015

*Primary Examiner* — John Zimmermann
(74) *Attorney, Agent, or Firm* — Studebaker Brackett PLLC

(57) ABSTRACT

A drying device (120) includes a liftable and lowerable conveying unit (40) which conveys a sheet on which ink is ejected, along a conveyance path (34); a liftable and lowerable drying unit (50) which faces the conveyance path (34) and dries the ink by heat; a lifting and lowering mechanism (60) capable of lowering a lower unit, which is a unit provided below among the conveying unit (40) and the drying unit (50), by gravity acting on the lower unit and lifting an upper unit, which is a unit provided above among the conveying unit (40) and the drying unit (50), to open the conveyance path (34); and a restriction mechanism (70) which restricts a lowering of the lower unit.

13 Claims, 9 Drawing Sheets

(52) U.S. Cl.
CPC ...... *B65H 2403/51* (2013.01); *B65H 2403/60* (2013.01); *B65H 2404/2693* (2013.01)

(56) References Cited

U.S. PATENT DOCUMENTS

| | | | | |
|---|---|---|---|---|
| 2008/0024582 | A1 * | 1/2008 | Yokoyama | B41J 11/007<br>347/104 |
| 2009/0231404 | A1 * | 9/2009 | Niekawa | B41J 11/0021<br>347/102 |
| 2022/0314661 | A1 * | 10/2022 | Kobayashi | B41J 11/00214 |

* cited by examiner

DRYING DEVICE AND IMAGE FORMING SYSTEM

TECHNICAL FIELD

The present invention relates to a drying device which dries ink ejected on a sheet and an image forming system including the drying device.

BACKGROUND

When an image is formed on a sheet using an inkjet recording device, the ink ejected on the sheet must be dried quickly. As an example of a technique for drying the ink, a drying device is known, which includes a conveying part which conveys the sheet and a heat source which dries the ink by radiant heat. However, the heat source that generate the radiant heat continues to generate the residual heat for a period of time, even when turned off. Therefore, if the sheet being conveyed is jammed, even if the heat source is turned off, the temperature of the sheet may rise due to the residual heat.

As a possible solution to this problem, for example, Patent Documents 1 to 3 describe that a member to block the radiant heat is provided. Patent Document 1 proposes a device including a shutter storage part and a shutter driving mechanism. The shutter storage part stores a shutter in a position where the direct light from a halogen heater is not received during a normal drying state. The shutter driving mechanism takes the shutter out of the shutter storage part in an abnormal state to shut off the light. Patent Document 2 proposes a shutter film configured to define a hot ray irradiation area so that the hot ray is not irradiated to an area other than the sheet in the conveyance belt while the hot ray is irradiated to the sheet in accordance with the passage of the sheet to the halogen heater. Patent Document 3 proposes a reflecting part and an openable/closable shutter part. The reflecting part has a shape that partially covers a heater, reflects a hot ray emitted by a heater and directs it toward an object to be heated. The shutter part shuts off the hot ray directing to the object from the heater and the reflecting part. The heater is heated with the shutter part closed before the object is irradiated with the hot ray.

PRIOR ART DOCUMENTS

Patent Literature

Patent Document 1: Japanese Patent Laid-Open No. 2003-170573
Patent Document 2: Japanese Patent Laid-Open No. 2009-214328
Patent Document 3: Japanese Patent Laid-Open No. 2015-80943

SUMMARY OF THE INVENTION

Problems to be Solved by Invention

However, in the configurations proposed in Patent Documents 1 to 3, it is conceivable that the temperature of the shutter rises. In this case, the temperature of the jammed sheet may increase when the jammed sheet touches on the shutter. There is also the problem that since a space between the shutter and the conveyance path is narrow, it becomes difficult to remove the jammed sheet. In addition, there is a risk of touching the heated shutter when removing the sheet.

In view of the above circumstances, it is an object of the present invention to provide a drying device capable of preventing an increase in temperature of a sheet stopped in a conveyance path and enhancing easiness and safety of work for removing the stopped sheet and an image forming system.

Means of Solving the Problems

In order to solve the above problems, a drying device according to the present invention includes a liftable and lowerable conveying unit which conveys a sheet on which ink is ejected, along a conveyance path; a liftable and lowerable drying unit which faces the conveyance path and dries the ink by heat; a lifting and lowering mechanism capable of lowering a lower unit, which is a unit provided below among the conveying unit and the drying unit, by gravity acting on the lower unit and lifting an upper unit, which is a unit provided above among the conveying unit and the drying unit, to open the conveyance path; and a restriction mechanism which restricts lowering of the lower unit.

An image forming system according to the present invention includes an inkjet recording device which ejects ink on a sheet; and the drying device according to claim 1, which dries the ink ejected by the inkjet recording device.

Effects of the Invention

According to the present invention, the temperature increasing of the sheet stopped in the conveyance path can be prevented without using power, and the easiness and safety of the work of removing the stopped sheet can be enhanced.

EMBODIMENT FOR CARRYING OUT THE INVENTION

Configuration of First Embodiment

Hereinafter, with reference to the attached drawings, a drying device 120 and an image forming system 100 according to the first embodiment of the present invention will be described.

Figure 1:
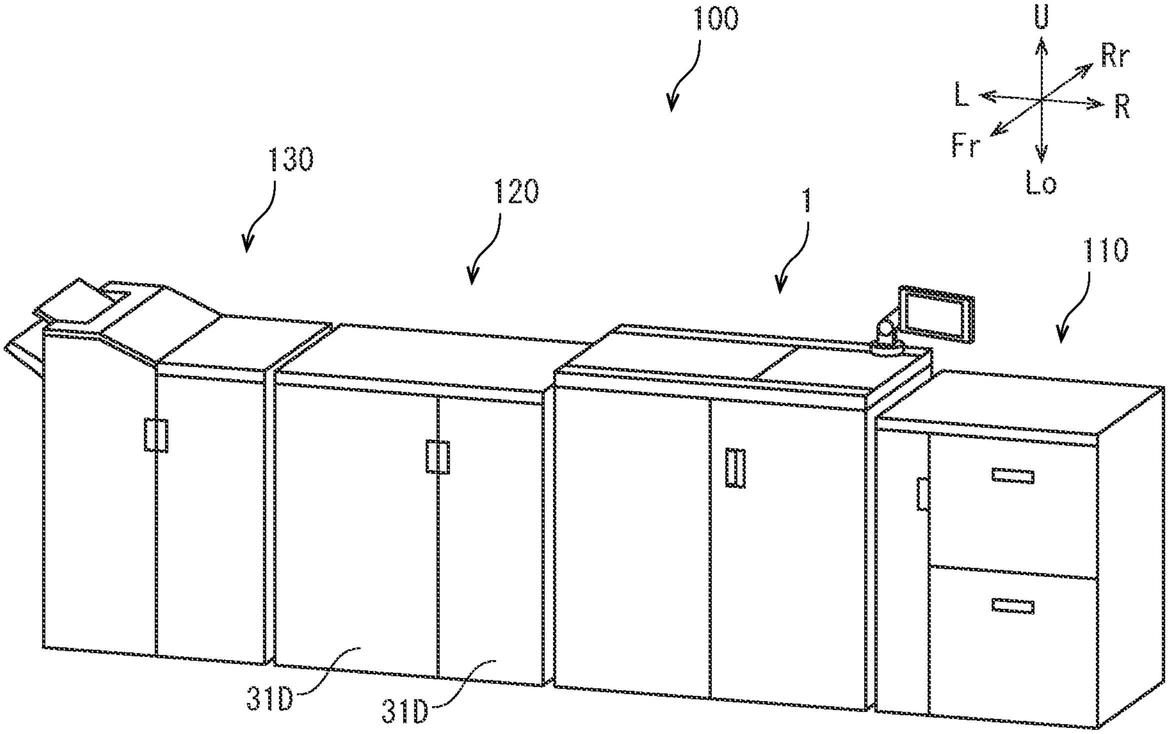
FIG. 1 is a perspective view showing an appearance of an image forming system according to one embodiment of the present invention.
Figure 2:
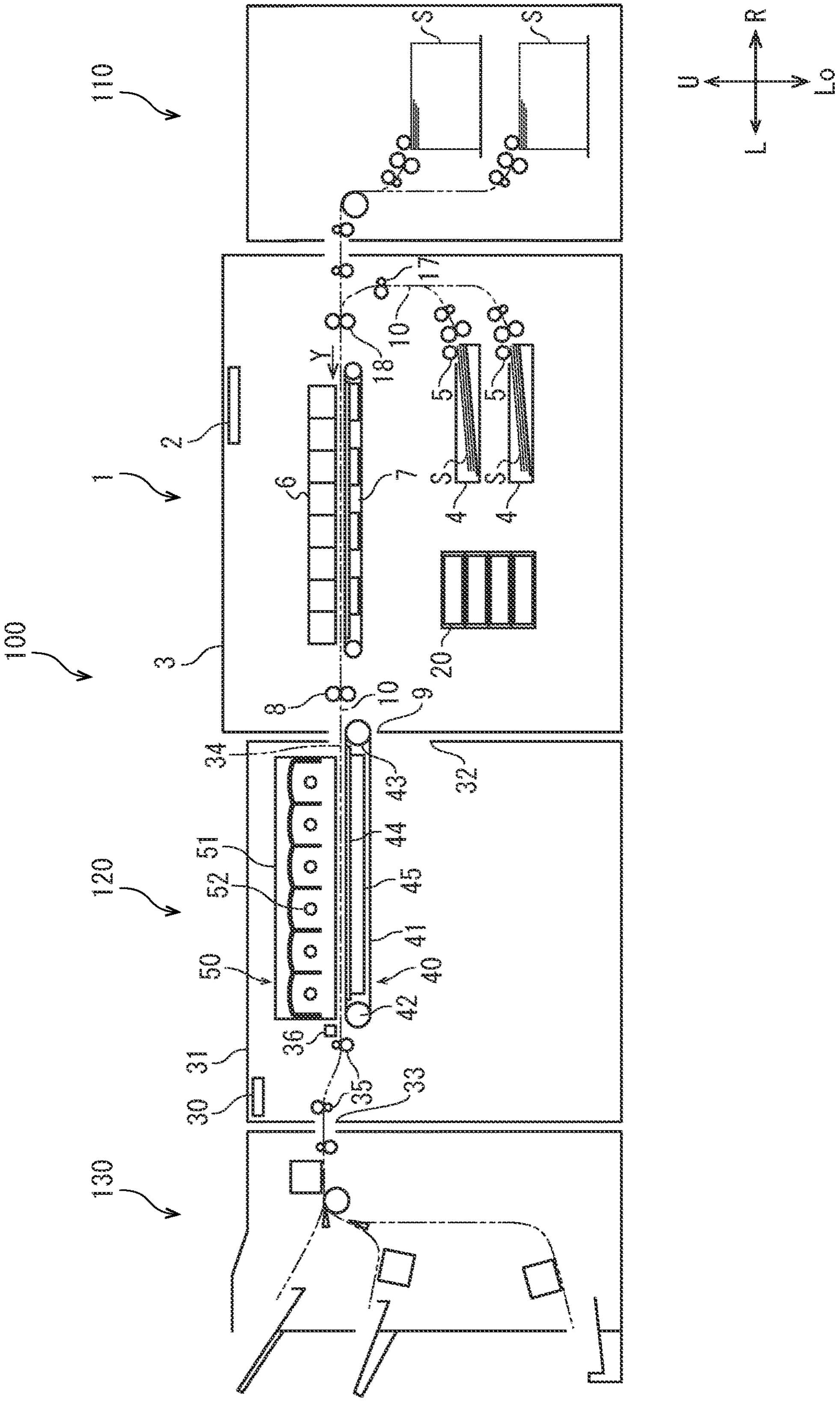
FIG. 2 is a front view schematically showing an inner configuration of the image forming system according to the embodiment of the present invention.

First, the entire configuration of the image forming system 100 according to the first embodiment will be described. FIG. 1 is a perspective view showing the appearance of the image forming system 100. FIG. 2 is a front view schematically showing the internal configuration of the image forming system 100. Hereafter, the front side of the paper plan on which FIG. 2 is drawn is defined as the front side of the image forming system 100, and the left-and-right direction is described with reference to the direction in which the image forming system 100 is viewed from the front side. In each figure, U, Lo, L, R, Fr and Rr indicate the upper, lower, left, right, front and rear, respectively.

The image forming system 100 includes a sheet feeding device 110, a printer 1 (an example of an inkjet recording device), a drying device 120, and a post-processing device 130. The sheet feeding device 110 includes a large capacity storage part capable of storing thousands of sheets S, and feeds the sheet S to the printer 1. The printer 1 is an inkjet image forming apparatus which ejects ink on the sheet S to form an image. The drying device 120 heats and dries the ink ejected on the sheet S. The post-processing device 130 performs post-processing such as punching, stapling and folding on the sheet S.

Next, an overview of the printer 1 will be described. The printer 1 includes a box-shaped body housing 3. In the lower portion of the body housing 3, sheet feeding cassettes 4 in which the sheet S such as a plain paper and a coated paper, and sheet feeding rollers 5 which feeds the sheet S from the sheet feeding cassette 4 are provided. Above the sheet feeding cassettes 4, a conveying unit 7 is provided, which attracts the sheet S and conveys it in the Y direction. Above the conveying unit 7, an image forming unit 6 including a plurality of inkjet heads (not shown) is provided. A discharge rollers pair 8 which discharges the sheet S having the image and a discharge port 9 through which the sheet S is discharged are provided in the upper left portion in the body housing 3. On the left side of the sheet feeding cassettes 4, ink containers 20 are provided to supply the ink to the image forming unit 6.

Inside the body housing 3, a conveyance path 10 from the sheet feeding cassettes 4 through the conveying unit 7 to the discharge port 9 is provided. On the conveyance path 10, a plurality of conveying rollers pairs 17 which convey the sheet S is provided. A registration rollers pair 18 is provided on the upstream side of the image forming unit 6 in the conveyance direction Y.

Each part of the printer 1 is controlled by a control part 2. The control part 2 includes a processor and a memory. The processor is, for example, a CPU (Central Processing Unit). The memory includes storage media such as ROM (Read Only Memory), RAM (Random Access Memory) and EEPROM (Electrically Erasable Programmable Read Only Memory). The processor performs various operations by reading and executing control programs stored in the memory. The control part 2 may be realized by an integrated circuit without using software.

The basic image forming operation of the printer 1 is as follows. When an image forming job is input to the printer 1 from an external computer or the like, the sheet feeding roller 5 feeds the sheet S from the sheet feeding cassette 4 to the conveyance path 10, and the registration rollers pair 18, whose rotation is stopped, corrects the skew of the sheet S. When the registration rollers pair 18 feeds the sheet S to the conveying unit 7 at a predetermined timing, the conveying unit 7 attracts the sheet S to the conveyance belt 21 and conveys it in the Y direction. When the control part 2 supplies the drive circuit with the gradation data corresponding to each nozzle of the inkjet head in synchronization with the conveyance of the sheet S, the drive circuit supplies the drive signal corresponding to the gradation data to the piezoelectric elements, and the ink droplets are ejected from the nozzles to form an image on the sheet S. The discharge rollers pair 8 discharges the sheet S having the image through the discharge port 9.

Figure 3:
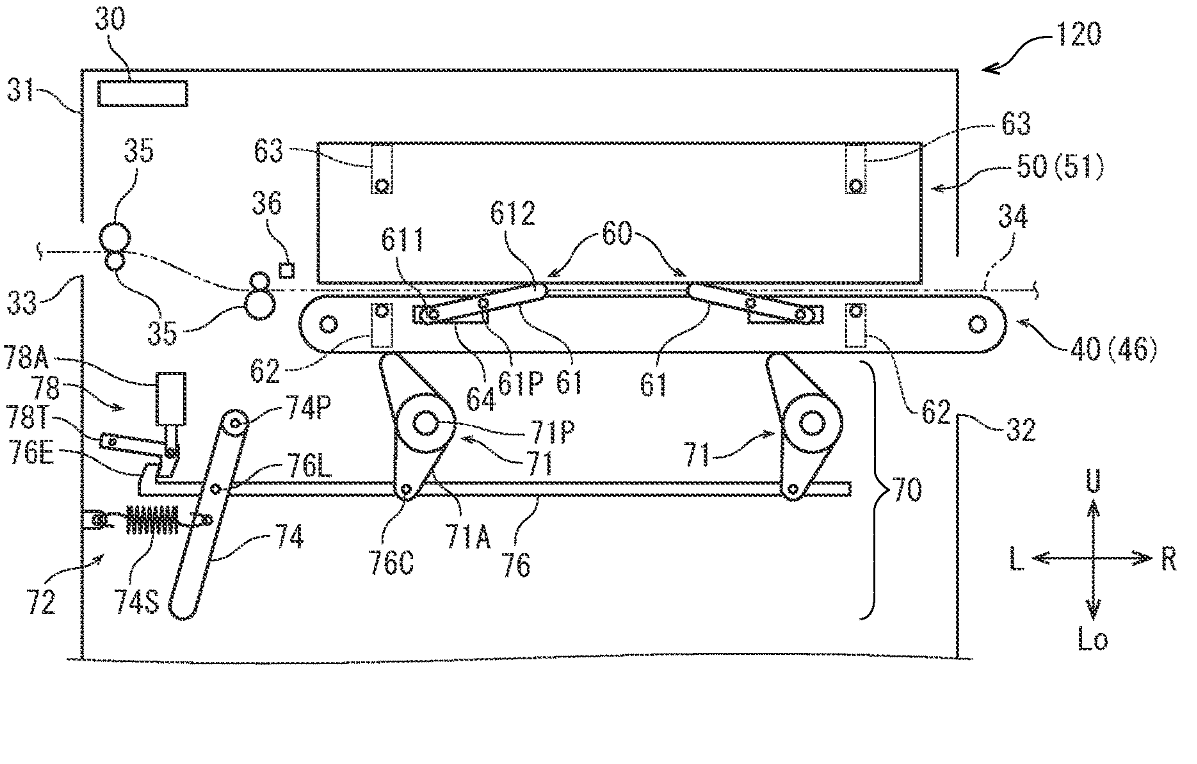
FIG. 3 is a front view schematically showing an inner configuration of a drying device according to the embodiment of the present invention.

[Drying Device] Next, the drying device 120 will be described in detail. FIG. 3 is a front view schematically showing the internal configuration of the drying device 120.

The drying device 120 includes a liftable and lowerable conveying unit 40 which conveys the sheet S on which the ink is ejected, along a conveyance path 34, a liftable and lowerable drying unit 50 which faces the conveyance path 34 and dries the ink by heat, a lifting and lowering mechanism 60 which lowers the lower unit, which is provided on the lower side among the conveying unit 40 and the drying unit 50, by gravity acting on the lower unit, and lifts the upper unit, which is provided on the upper side among the conveying unit 40 and the drying unit 50, and a restriction mechanism 70 which restricts the lowering of the lower unit. In this embodiment, the lower unit is the conveying unit 40 and the upper unit is the drying unit 50.

Specifically, the drying device 120 includes a parallelepiped body housing 31. The conveying unit 40 is provided slightly above the center of the body housing 31, and the drying unit 50 is provided above the conveying unit 40. The body housing 31 is provided with a carry-in port 32 on the right side and a carry-out port 33 on the left side, and the conveyance path 34 is provided from the carry-in port 32 to the carry-out port 33 through a gap between the conveying unit 40 and the drying unit 50. A conveying rollers pair 35 is provided on the downstream side of the conveying unit 40 in the conveyance direction Y. The right end portion of the conveying unit 40 extends from the carry-in port 32 to the outside of the body housing 31. When the right end portion of the conveying unit 40 is inserted into the discharge port 9 of the printer 1, the conveyance path 10 of the printer 1 and the conveyance path 34 of the drying device 120 are connected (see FIG. 2). A door 31D is provided on the front surface of the body housing 31 (see FIG. 1).

[Conveying Unit] The conveying unit 40 (see FIG. 2) is provided with an endless conveyance belt 41 provided with a number of air vents (not shown) and wound around a driving roller 42 and a driven roller 43, a conveyance plate 44 provided with a number of air vents (not shown), the upper surface of which is in contact with the inner surface of the conveyance belt 41, and a suction part 45 which sucks air through the air vents of the conveyance plate 44 to attract the sheet S to the conveyance belt 41. When the driving roller 42 is driven by a driving part (not shown) such as a motor, the conveyance belt 41 travels in the counterclockwise direction, and the sheet S attracted by the conveyance belt 41 is conveyed in the Y direction. Conveyance frames 46 are provided on the front and rear sides of the conveying unit 40, and the driving roller 42, the driven roller 43, the conveyance plate 44, the suction part 45 and the others are supported by the conveyance frames 46. It is desirable that the mass of the conveying unit 40 is greater than the mass of the drying unit 50.

[Conveying Unit Guide Part] A conveying unit guide part 62 guides the lifting and lowering of the conveying unit 40. The conveying unit guide part 62 includes a groove or an oblong hole formed in the body housing 31 so as to be formed its longitudinal direction along the upper-and-lower direction, and a protrusion formed in the conveyance frame 46. Sliding of the protrusion against the groove or oblong hole guides the lifting and lowering of the conveying unit 40. The groove or oblong hole may be provided in the conveyance frame 46, and the protrusion may be provided in the body housing 31.

[Drying unit] The drying unit 50 has a box-shaped drying housing 51 with the lower portion opened, and a heat source 52 is housed in the drying housing 51 (see FIG. 2).

[Heat Source] The heat source 52 has a rod like shape or band like shape whose longitudinal direction is along the front-and-rear direction (one example of a direction crossing the conveyance direction Y), and both the front and rear end portions are fixed to the drying housing 51. The heat source 52 is a halogen heater, a carbon heater, an infrared LED (Light Emitting Diode), a ceramic heater, or the like. Multiple heat sources 52 (in this example, six) are provided in the conveyance direction Y at equal intervals. Above each heat source 52, a reflector is provided that faces the conveyance path 34 via the heat source 52.

[Drying Unit Guide Part] A drying unit guide part 63 guides the lifting and lowering of the drying unit 50. The drying unit guide part 63 includes a groove or oblong hole formed in the body housing 31 so as to be formed its longitudinal direction along the upper-and-lower direction, and a protrusion formed in the drying housing 51. Sliding of the protrusion against the groove or oblong hole guides the lifting and lowering of the drying unit 50. The groove or oblong hole may be provided in the drying housing 51 and the protrusion may be provided in the body housing 31.

[Lifting and Lowering Mechanism] The lifting and lowering mechanism 60 is provided on the upper portions of the front and rear conveyance frames 46. The front lifting mechanism and lowering mechanism 60 is described below, but the rear lifting and lowering mechanism 60 has the same configuration. The lifting and lowering mechanism 60 includes a lever 61 with a first end 611 rockably connected to the conveying unit 40, a second end 612 slidable against the lower surface of the drying unit 50, and a fulcrum 61P midway between the first end 611 and the second end 612. Specifically, the lever 61 is rockable around the fulcrum 61P fixed to the body housing 31. The fulcrum 61P is provided at the longitudinal center of the lever 61. A lever guide part 64 guides the sliding of the first end 611 of the lever 61 in the left-and-right direction, and permits the rocking of the lever 61 with respect to the conveyance frames 46. The lever guide part 64 includes a groove or oblong hole formed in the conveyance frame 46 so as to be formed its longitudinal direction along the left-and-right direction, and a protrusion formed in the first end 611 of the lever 61. The protrusion slide against the groove or oblong hole. The second end 612 of the lever 61 is in contact with the lower surface of the dry housing 51.

The lever 61 is provided at multiple locations (in this example, two locations) in the left-and-right direction of the conveyance frame 46. The left and right levers 61 have a symmetrical structure in the left-and-right direction. In the example of FIG. 3, the first end 611 of the left lever 61 is located on the left side, the second end 612 is located on the right side. The first end 611 of the right lever 61 is located on the right side, and the second end 612 is located on the left side. The positional relationship between the first end 611 and the second end 612 of the lever 61 may be opposite to that in FIG. 3. The left and right levers 61 need not be symmetrical in the left-and-right direction.

The lever ratio, which is the ratio of the length from the fulcrum 61P to the second end 612 to the length from the fulcrum 61P to the first end 611, can be set to any value. By making the lever ratio greater than 1, the lifting amount of the drying unit 50 can be increased.

[Restriction Mechanism] The restriction mechanism 70 is provided below the front and rear conveyance frames 46. The front restriction mechanism 70 is described below, but the rear restriction mechanism 70 has the same configuration. The restriction mechanism 70 is provided with an eccentric cam 71 in contact with the lower surface of the conveying unit 40 and a cam restriction mechanism 72 which restrict the rocking of the eccentric cam 71 in a state where the conveying unit 40 is lifted.

[Eccentric Cam] The eccentric cam 71 is rockable around a cam fulcrum 71P fixed to the body housing 31. The eccentric cam 71 is provided at multiple locations (in this example, two locations) in the left-and-right direction below the conveyance frames 46. The eccentric cam 71 is provided with a radially projecting arm part 71A.

[Cam Restriction Mechanism] The cam restriction mechanism 72 includes a lever 74, a rod 76 and a rod restriction mechanism 78.

[Lever] The lever 74 is provided on the left side of the left eccentric cam 71. The lever 74 is rockable around a lever fulcrum 74P fixed to the body housing 31. The lever fulcrum 74P is provided at the same height as the cam fulcrum 71P. The lever 74 is provided with a lever biasing part 74S which biases the lever 74 leftward. In this example, the lever biasing part 74S is a tension coil spring, but the lever biasing part 74S may be a compression coil spring, a torsion coil spring or the like.

[Rod] The rod 76 is a rod whose longitudinal direction is long the left-and-right direction. The rod end portion 76E (in this example, the left end portion of the rod 76) have a protrusion protruding upward. The rod 76 is connected to the lever 74 by a lever connecting part 76L and to the tip end portion of the arm part 71A of the eccentric cam 71 by a cam connecting part 76C. The lever 74 is rockable with respect to the rod 76 around the lever connecting part 76L. The eccentric cam 71 is rockable with respect to the rod 76 around the cam connecting part 76C. The distance between the lever fulcrum 74P and the lever connecting part 76L is equal to the distance between the cam fulcrum 71P and the cam connecting part 76C. A link mechanism is formed by the lever 74, the eccentric cam 71 and the rod 76, and the lever 74 and the eccentric cam 71 are rocked in the clockwise and counterclockwise directions in conjunction with the movement of the rod 76 in the left-and-right direction. In place of the lever biasing part 74S, or in addition to the lever biasing part 74S, a mechanism for biasing the rod 76 in the same direction as the lever biasing part 74S may be provided.

[Rod Restriction Mechanism] The rod restriction mechanism 78 is provided with a solenoid actuator 78A and a trigger 78T. The iron core of the solenoid actuator 78A is exposed downward. The trigger 78T has a protrusion protruding downward, and is rockable around a fulcrum fixed to the body housing 31, and the iron core of the solenoid actuator 78A is connected. The solenoid actuator 78A is a pull-type, and retreats the trigger 78T upward by drawing the iron core upward when energized. The solenoid actuator 78A is controlled by the control part 30.

In this embodiment, the lever 74 and the rod restriction mechanism 78 are provided on the left side of the rod 76, but they may be provided on the right side of the rod 76. In addition, the trigger 78T may be driven by a motor or the like instead of the solenoid actuator 78A. In addition, the shapes of the trigger 78T and the rod end portion 76E need not have the shapes shown, but can be any shape as long as the trigger 78T can be hooked on the rod end portion 76E to restrict the rightward movement of the rod 76.

[Detection Part] The drying device 120 is provided with a detection part 36 which detects the stop of the conveying of the sheet S in the conveyance path 34 (see FIG. 2). The stop of the conveying of the sheet S occurs when the sheet S is jammed in the conveyance path 34 or when the conveying unit 40 or the conveying rollers pair 35 fails. In this example, the detection part 36 is provided on the downstream side of the drying unit 50 in the conveyance direction Y, but the detection part 36 may be provided at multiple locations on the conveyance path 34. The detection part 36 is, for example, a transmission or reflection type optical sensor, a torque sensor, or the like. In the case of an optical sensor, the stop of conveying of the sheet S is detected when the sheet S blocks the light. In the case of the torque sensor, the stop of conveyancing of the sheet S is detected by catching the abnormal value of the torque of the motor (not shown) that drives the conveying unit 40 or the conveying rollers pair 35.

[Control Part] Each part of the drying device 120 is controlled by a control part 30 (see FIG. 2). The control part 30 includes a processor and a memory. A processor is, for example, a CPU (Central Processing Unit). The memory includes storage media such as ROM (Read Only Memory), RAM (Random Access Memory) and EEPROM (Electrically Erasable Programmable Read Only Memory). The processor performs various operations by reading and executing control programs stored in the memory. The control part 30 may be realized by an integrated circuit that does not use software. When the stop of conveying of the sheet S is detected by the detection part 36, the control part 30 cancels the restriction of lowering of the conveying unit 40 by the restriction mechanism 70.

Figure 4:
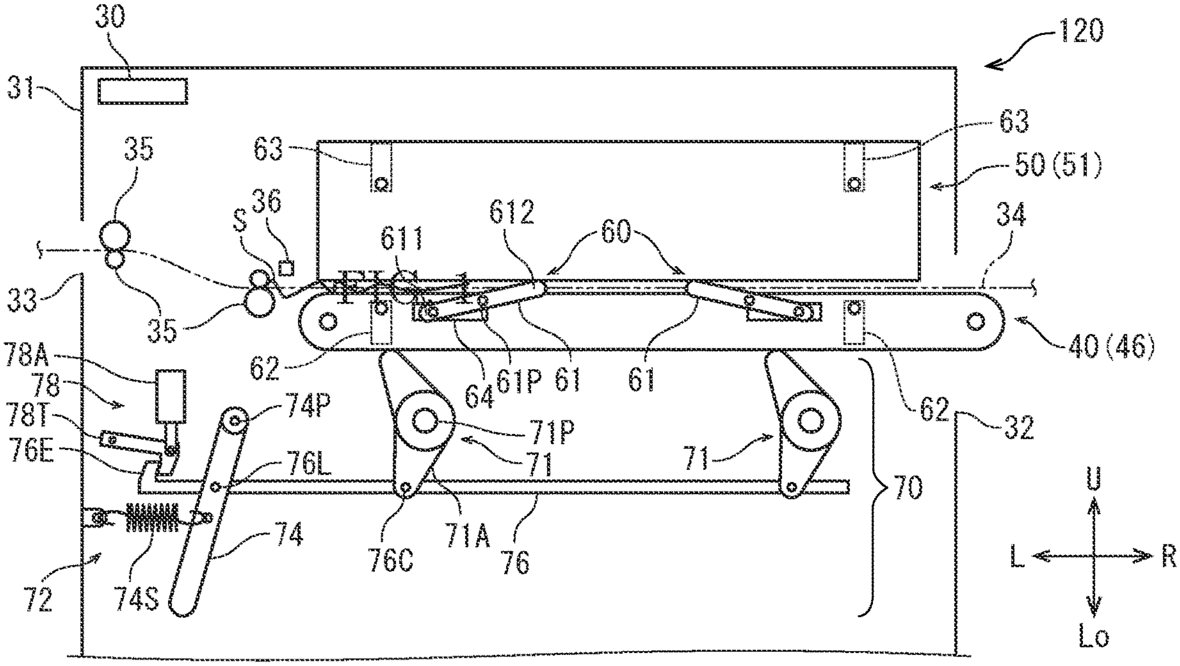
FIG. 4 is a front view explaining an operation of the drying device according to the embodiment of the present invention.
Figure 5:
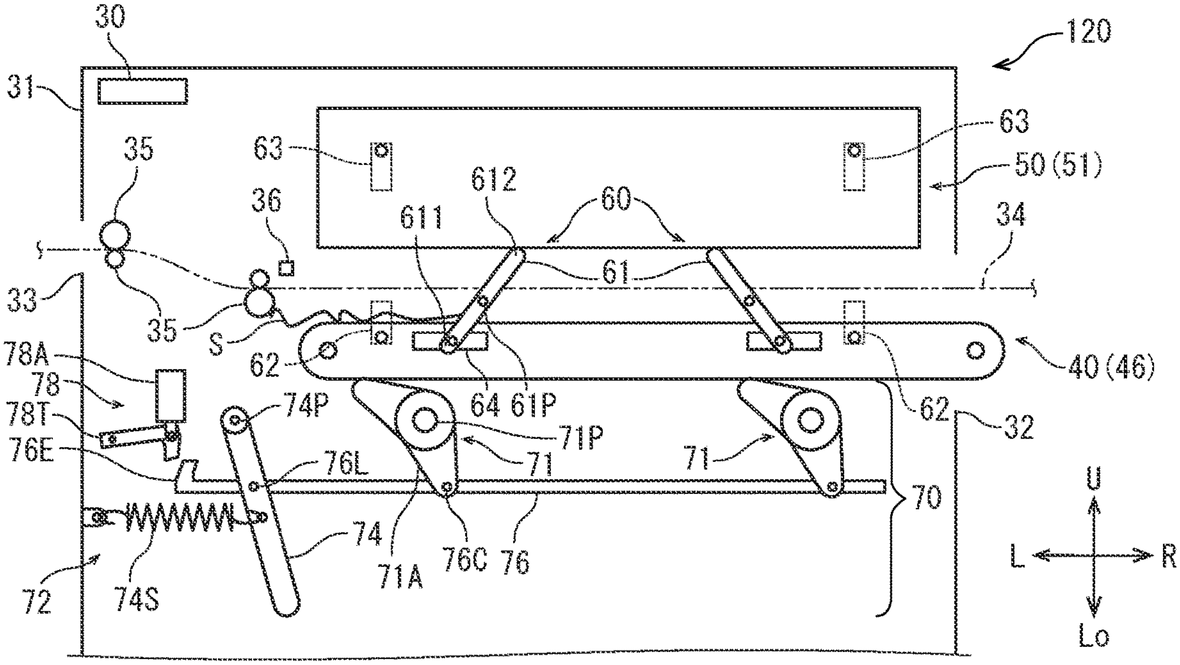
FIG. 5 is a front view explaining operation of the drying device according to the embodiment of the present invention.

Next, the operation of the drying device 120 will be described. FIG. 4 and FIG. 5 are front views explaining the operation of the drying device 120. In the initial state (see FIG. 3), the protrusion of the trigger 78T is hooked to the protrusion of the rod end portion 76E. At this time, the lever 74 and the rod 76 are pulled leftward such that the eccentric cam 71 pushes up the conveying unit 40. The rightward movement of the rod 76 is also restricted. As a result, the counterclockwise rocking of the eccentric cam 71 and the lever 74 is also restricted. In addition, by being pushed up the conveying unit 40, the lever 61 is laid down and the drying unit 50 is lowered.

When an image forming job is input to the printer 1, the control part 30 energizes the heat source 52, supplies radiant heat to the sheet S carried in through the carry-in port 32 to dry the ink, and sends the sheet S to the post-processing device 130 through the carry-out port 33.

When the stop of conveying of the sheet S is detected by the detection part 36 (see FIG. 4), the control part 30 retreats the trigger 78T upward by energizing the solenoid actuator 78A for a predetermined time (see FIG. 5). Then, when the trigger 78T disengages from the rod end portion 76E, the restriction of the rightward movement of the rod 76 is released. As a result, the restriction of the counterclockwise rocking of the eccentric cam 71 is also released. Therefore, gravity acting on the conveying unit 40 causes the conveying unit 40 to be lowered and the eccentric cam 71 and lever 74 to be rocked in the counterclockwise direction. When the conveying unit 40 is lowered, the lever 61 is raised and the drying unit 50 is pushed up. The lowering of the conveying unit 40 and the lifting of the drying unit 50 are stopped at a position where the force in which the conveying unit 40 pushes the eccentric cam 71 downward is balanced by the force in which the lever biasing part 74S pulls the lever 74 leftward.

Next, the user opens the door 31D of the drying device 120 (see FIG. 1), removes the sheet S stopped in the conveyance path 34, operates the lever 74 in the clockwise direction, and hooks the trigger 78T to the rod end portion 76E (see FIG. 3). Then, the rod 76 is moved leftward, the eccentric cam 71 is rocked in the clockwise direction and then the conveying unit 40 is pushed up. Also, when the conveying unit 40 is pushed up, the lever 61 is laid down and the drying unit 50 is lowered. Finally, the user closes the door 31D.

According to the drying device 120 according to the present embodiment described above, the lifting and lowering mechanism 60 is provided, which lowers the lower unit, which is provided on the lower side among the conveying unit 40 and the drying unit 50, by gravity acting on the lower unit, and lifts the upper unit, which is provided on the upper side among the conveying unit 40 and the drying unit 50. Therefore, the temperature increasing of the sheet stopped in the conveyance path 34 can be prevented without using power, and the easiness and safety of the work of removing the stopped sheet S can be enhanced.

The distance by which the lower unit can be lowered may be limited by other design factors of the drying device 120. For example, when performing both-sided printing in the image forming system 100, a conveying unit for the both-sided printing may be provided under the lower unit. The conveying unit for both-sided printing conveys the sheet S printed on the front side and dried by the drying device 120 to the printer 1 for printing the back side. According to the configuration described above, because the upper unit is lifted, the distance between the units can be increased more than when only the lower unit is lowered. This makes it possible to increase the distance between units even when the lowering distance of the lower unit is small.

In addition, according to the drying device 120 according to the present embodiment, the lifting and lowering mechanism 60 has the lever 61 in which the first end 611 is rockably connected to the conveying unit 40, the second end 612 is slidable against the lower surface of the drying unit 50, and the fulcrum 61P is provided midway between the first end 611 and the second end 612, so that the lifting and lowering mechanism 60 can be realized with a simple configuration.

In addition, according to the drying device 120 according to the present embodiment, since the restriction mechanism 70 is provided with the eccentric cam 71 that is in contact with the lower surface of the conveying unit 40 and the cam restriction mechanism 72 that restricts the rocking of the eccentric cam 71 in the state where the conveying unit 40 is lifted, the restriction mechanism 70 can be realized with a simple configuration.

Furthermore, according to the drying device 120 according to the present embodiment, since the mass of the conveying unit 40 is larger than that of the drying unit 50, the conveying unit 40 and the drying unit 50 can be separated without supplying power for lifting and lowering.

Even if the mass of the conveying unit 40 is equal to or less than the mass of the drying unit 50, the conveying unit 40 and the drying unit 50 can be separated without supplying power by adjusting the ratio of the length from the fulcrum 61P of the lever 61 to the first end 611 to the length from the fulcrum 61P to the second end 612.

In addition, the drying device 120 according to the present embodiment includes the detection part 36 which detects the stop of the conveying of the sheet S in the conveyance path 34 and the control part 30 which releases the restriction of the lowering of the conveying unit 40 by the restriction mechanism 70 when the stop of the conveying of the sheet S is detected by the detection part 36, so that the conveying unit 40 and the drying unit 50 can be separated quickly when the conveying of the sheet S is stopped.

The above embodiment may be modified as follows.

First Modified Example

Figure 6:
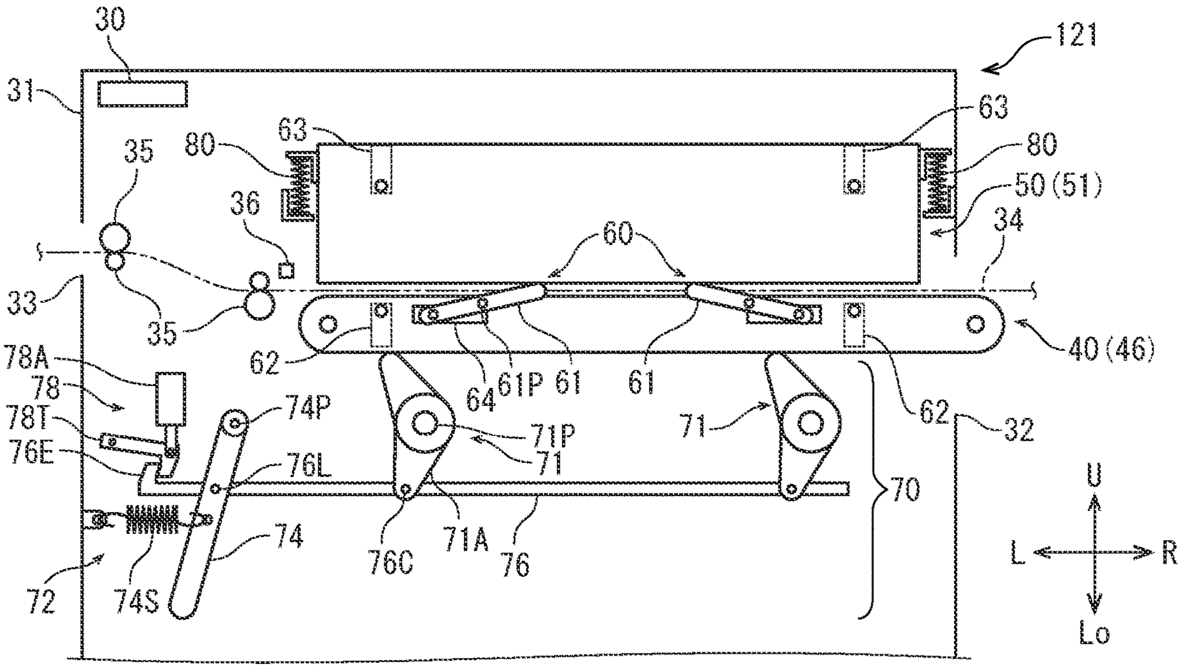
FIG. 6 is a front view schematically showing an inner configuration of the drying device according to a first modified example of the embodiment of the present invention.

FIG. 6 is a front view schematically showing the inner configuration of the drying device 121 according to the first modified example. In this example, in addition to the configuration of the above embodiment, a drying unit biasing part 80 (an example of a biasing part) is provided on the lateral side of the drying unit 50 to bias the drying unit 50 upward. With this configuration, energy for lifting the drying unit 50 is assisted, so that the conveying unit 40 and the drying unit 50 can be separated quickly. Even if the mass of the conveying unit 40 is less than or equal to the mass of the drying unit 50, the conveying unit 40 and the drying unit 50 can be separated without supplying power by compensating the difference in mass with the drying unit biasing part 80.

The action in which the biasing part biases the drying unit 50 (upper unit) upward includes a case where it biases the drying unit 50 indirectly. That is, the biasing part may bias the drying unit 50 (upper unit) upward by biasing the conveying unit 40 (lower unit) downward.

Second Modified Example

Figure 7:
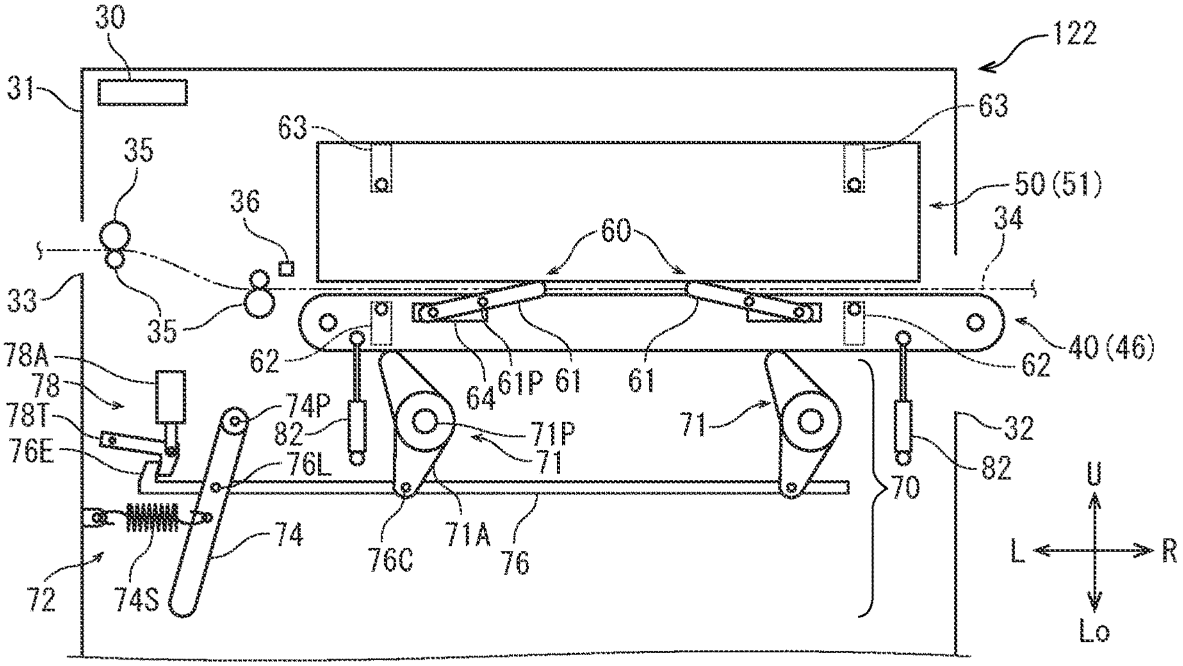
FIG. 7 is a front view schematically showing an inner configuration of the drying device according to a second modified example of the embodiment of the present invention.

FIG. 7 is a front view schematically showing the inner configuration of the drying device 122 according to the second modified example. In this example, in addition to the configuration of the above embodiment, a damper 82 is provided below the conveying unit 40 to attenuate energy generated when the conveying unit 40 is lowered. With this configuration, the shock generated when the conveying unit 40 is lowered can be relieved. In place of the damper 82, a torque limiter or the like that stops transmitting torque when the torque acting on the eccentric cam 71 exceeds the threshold may be provided.

Third Modified Example

Figure 8:
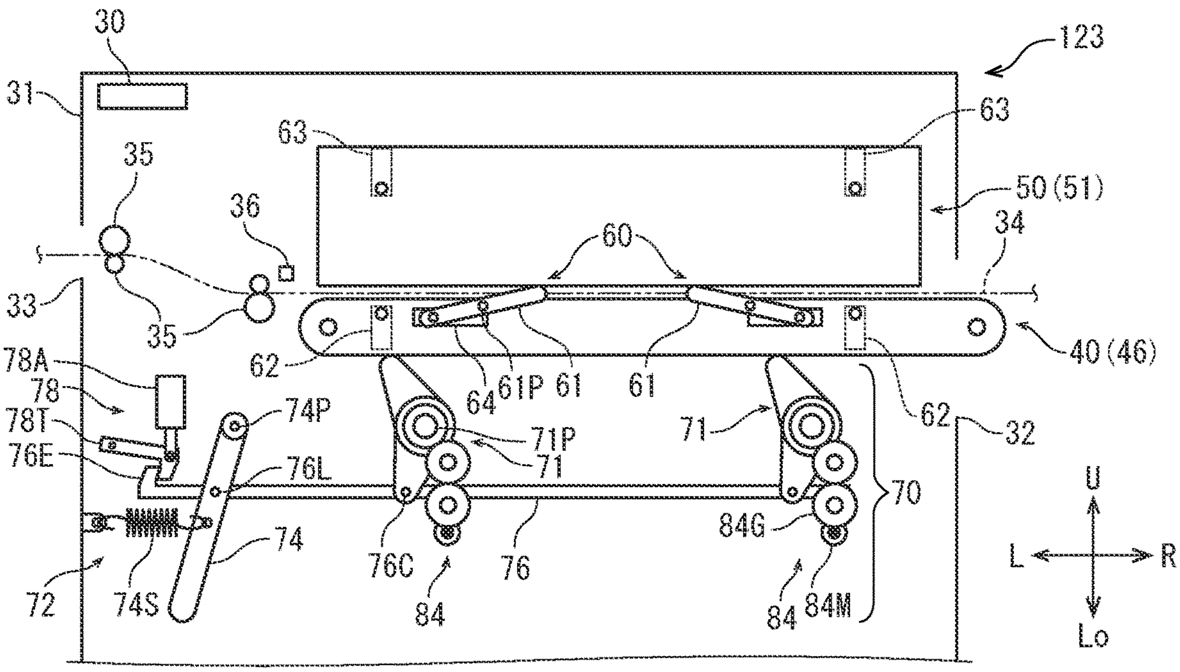
FIG. 8 is a front view schematically showing an inner configuration of the drying device according to a third modified example of the embodiment of the present invention.

FIG. 8 is a front view schematically showing the inner configuration of the drying device 123 according to the third modified example. In this example, in addition to the configuration of the above embodiment, a driving part 84 is provided, which drives the eccentric cam 71. The driving part 84 includes a motor 84M and a gear train 84G which transmits driving force from the output shaft of the motor 84M to the eccentric cam 71. According to this configuration, even if the user does not operate the lever 74 after the removal of the sheet S stopped on the conveyance path 34, the conveying unit 40 and the drying unit 50 can be brought into close to each other. This configuration is advantageous in a case where it is difficult to manually push up the conveying unit 40 due to its large mass.

Fourth Modified Example

Figure 9:
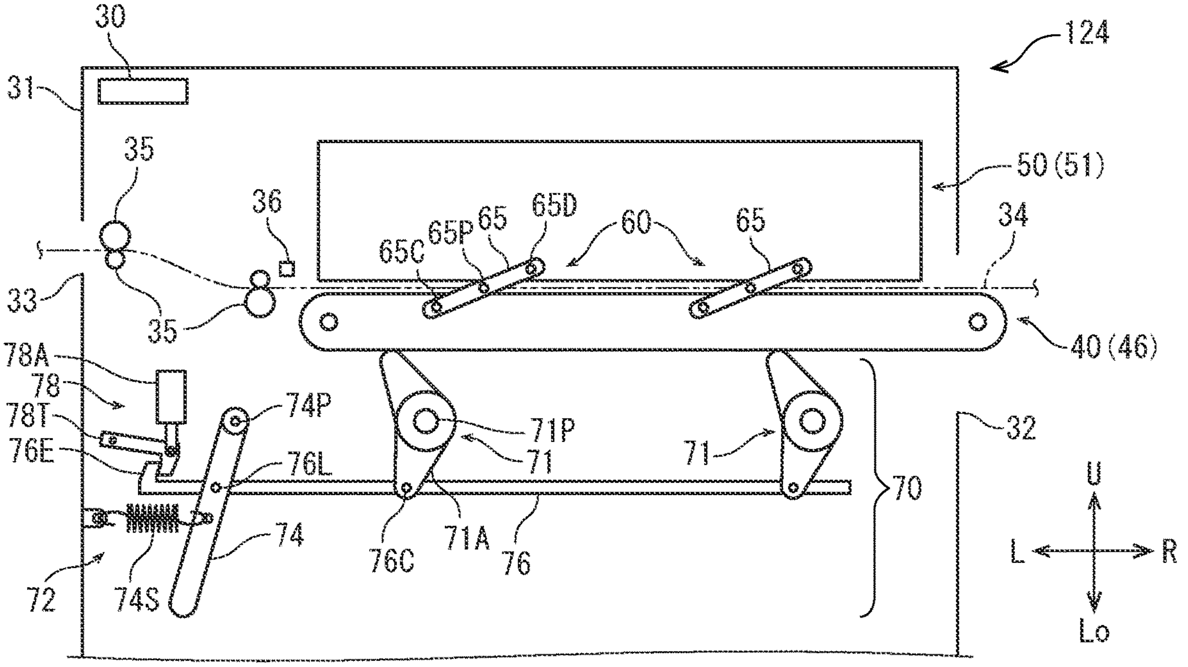
FIG. 9 is a front view schematically showing an inner configuration of the drying device according to a fourth modified example of the embodiment of the present invention.
Figure 10:
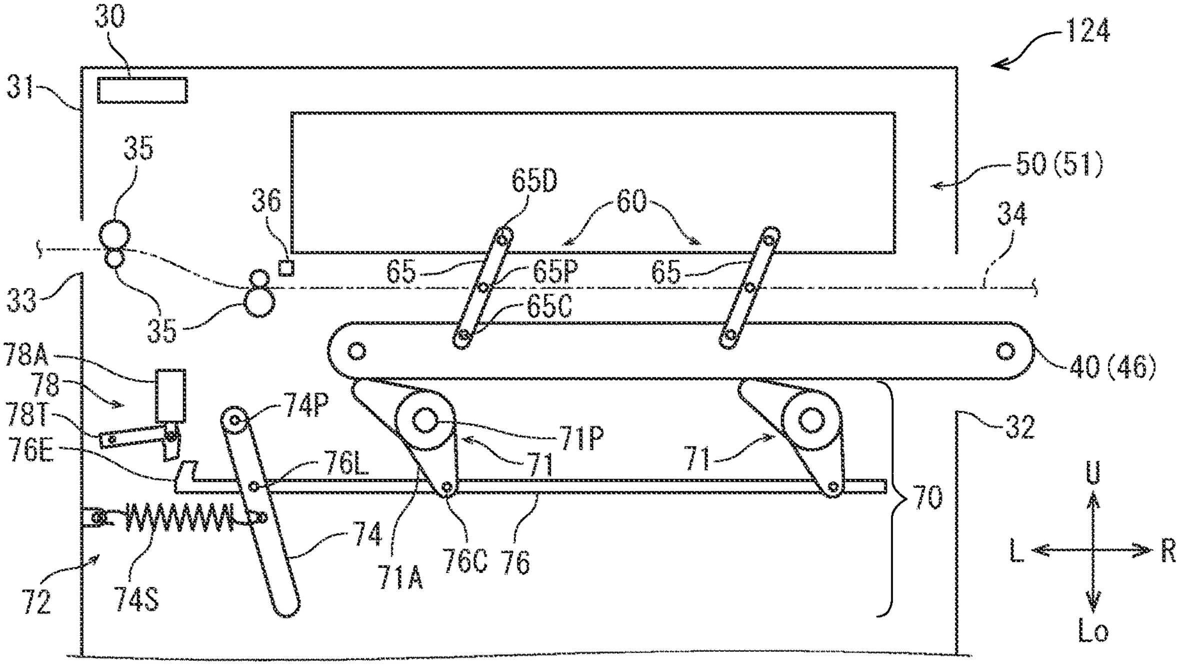
FIG. 10 is a front view schematically showing 1n inner configuration of the drying device according to a fourth modified example of the embodiment of the present invention.

FIG. 9 and FIG. 10 are front views schematically showing the inner configuration of the drying device 124 according to the fourth modified example. In this example, the lever guide part 64 (see FIG. 3) is not provided. The first end 611 of the lever 61 is connected to the conveying unit 40 by the conveying unit fulcrum 65C, and the lever 61 is rockable around the conveying unit fulcrum 65C. The second end 612 of the lever 61 is connected to the drying unit 50 by the drying unit fulcrum 65D, and the lever 61 is rockable around the drying unit fulcrum 65D. When the restriction of the rocking of the eccentric cam 71 is released by the retraction of the trigger 78T upward, the conveying unit 40 is lowered by the gravity acting on the conveying unit 40, and the lever 61 is raised to push up the drying unit 50. With this configuration, the lifting and lowering mechanism 60 can be realized with a simple configuration equivalent to that of the above embodiment.

Fifth Modified Example

Figure 11:
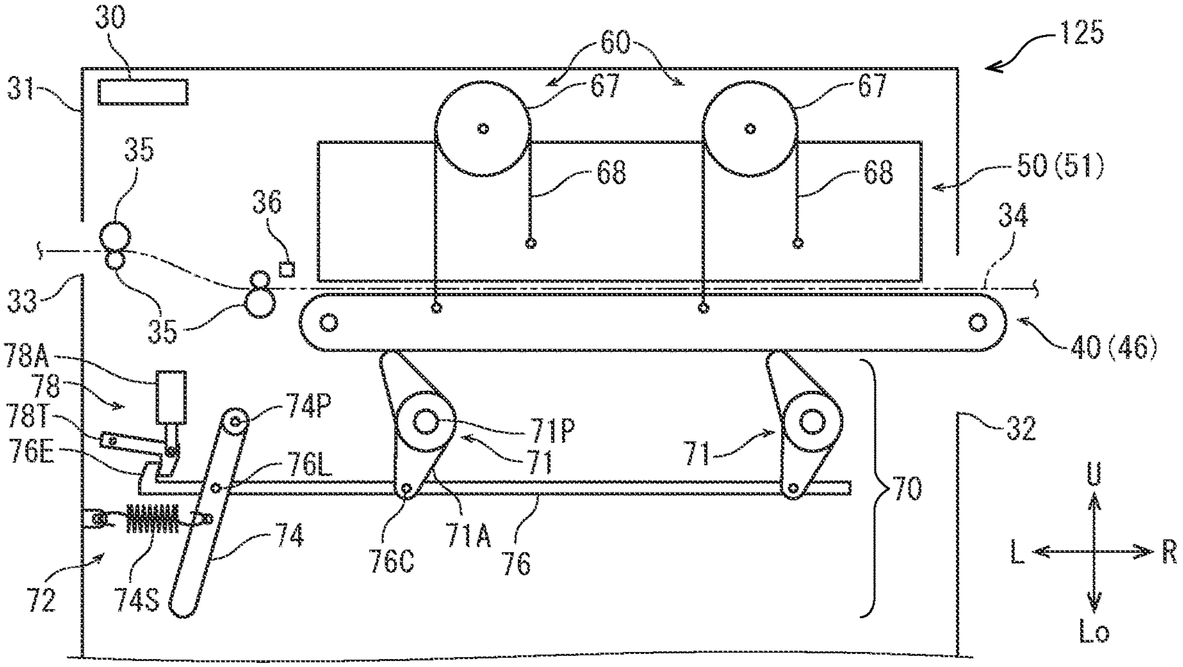
FIG. 11 is a front view schematically showing an inner configuration of the drying device according to a fifth modified example of the embodiment of the present invention.
Figure 12:
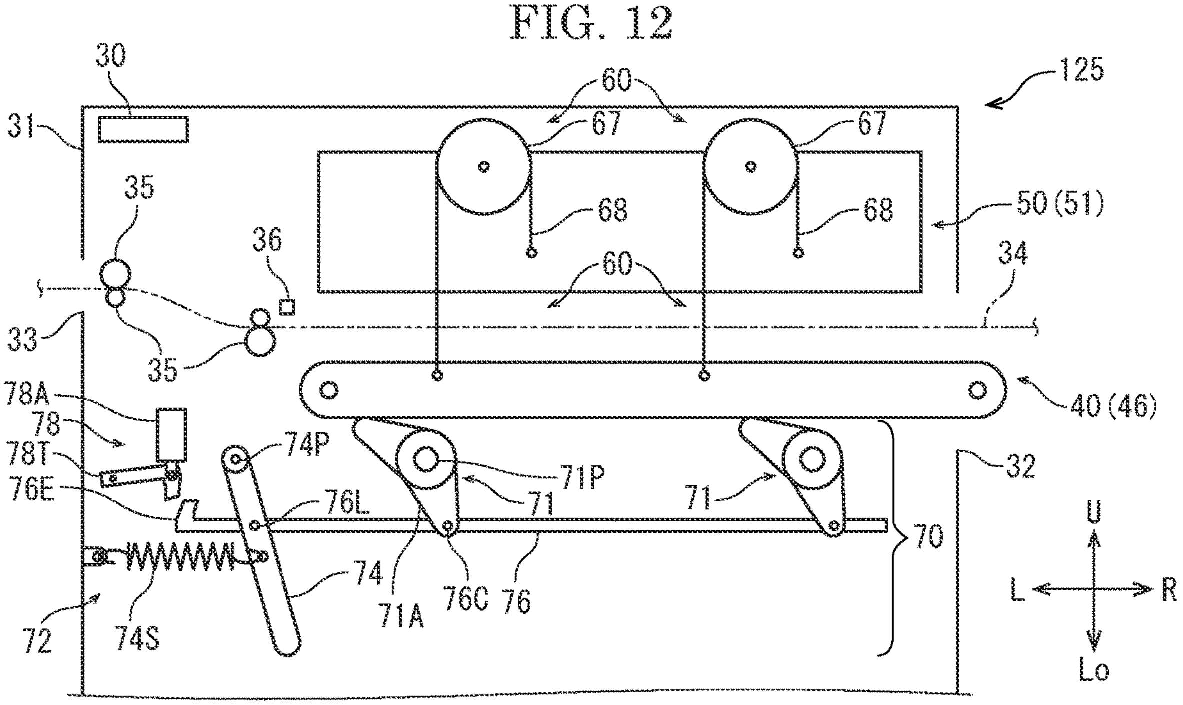
FIG. 12 is a front view schematically showing then inner configuration of the drying device according to the fifth modified example of the embodiment of the present invention.

FIG. 11 and FIG. 12 are front views schematically showing the inner configuration of the drying device 125 according to the fifth modified example. In this example, a pulley 67 and a wire 68 are provided in place of the lever 61 in the above embodiment. The shaft of the pulley 67 is fixed to the body housing 31. One end of the wire 68 is connected to the conveying unit 40 and the other end is connected to the drying unit 50. When the restriction of the rocking of the eccentric cam 71 is released by the retraction of the trigger 78T upward, the conveying unit 40 is lowered by the gravity acting on the conveying unit 40, and the drying unit 50 is pulled up by the wire 68. With this configuration, the lifting and lowering mechanism 60 can be realized with a simple configuration equivalent to that of the above embodiment.

Sixth Modified Example

Figure 13:
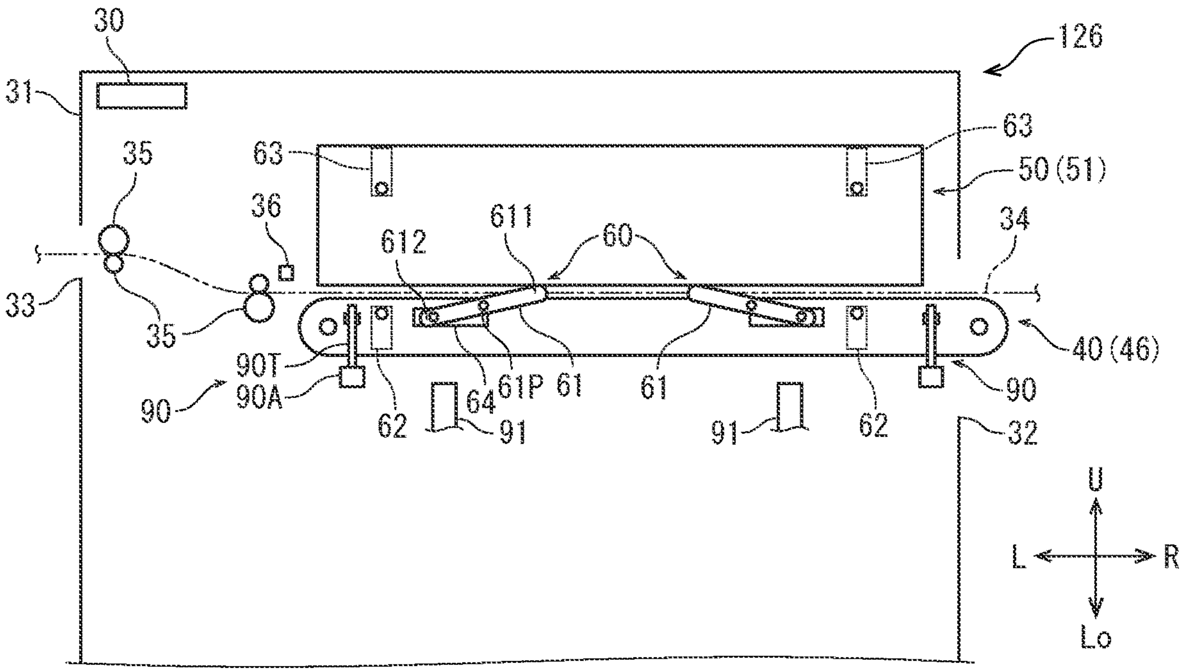
FIG. 13 is a front view schematically showing an inner configuration of the drying device according to a sixth modified example of the embodiment of the present invention.
Figure 14:
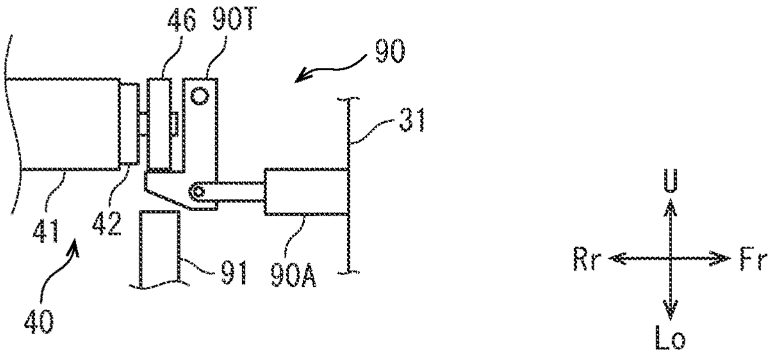
FIG. 14 is a left side view schematically showing a restriction mechanism of the drying device according to the sixth modified example of the embodiment of the present invention.
Figure 15:
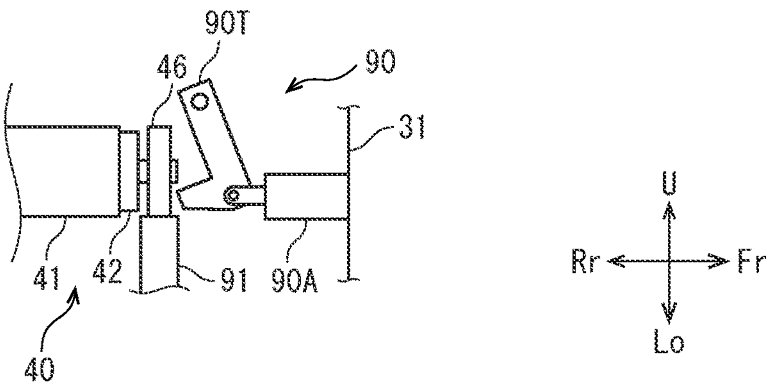
FIG. 15 is a left side view schematically showing the restriction mechanism according to the sixth modified example of the embodiment of the present invention.

FIG. 13 is a front view schematically showing the inner configuration of the drying device 126 according to the sixth modified example. FIG. 14 and FIG. 15 are left side views schematically showing the restriction mechanism 90 according to the sixth modified example. In this example, in place of the restriction mechanism 70 of the above embodiment, the restriction mechanism 90 is provided. The restriction mechanisms 90 are provided on the front and rear sides of the conveying unit 40. The front restriction mechanism 90 is described below, but the rear restriction mechanism 90 has the same configuration except that the front and rear directions are different.

The restriction mechanism 90 is provided at multiple locations (in this example, two locations) in the left-and-right direction in front of the conveyance frame 46. The restriction mechanism 90 includes a solenoid actuator 90A and a trigger 90T. The iron core of the solenoid actuator 90A is exposed to the rear side. The trigger 90T has a protrusion protruding rearward, is rockable around a fulcrum fixed to the body housing 31, and the iron core of the solenoid actuator 90A is connected. The solenoid actuator 90A is a pull-type, and retreats the trigger 90T forward by drawing the iron core forward when energized. The solenoid actuator 90A is controlled by the control part 30. In place of the solenoid actuator 90A, the trigger 90T may be driven by a motor or the like. A stop member 91 fixed to the body housing 31 is provided below the conveyance frame 46. The stop member 91 stops the conveyance frame 46 at a predetermined height when the conveying unit 40 is lowered.

In the initial state (see FIG. 13 and FIG. 14), the protrusion of the trigger 90T is hooked to the lower end portion of the conveyance frame 46, and the lowering of the conveying unit 40 is restricted. When the stop of conveying of the sheet S is detected by the detection part 36, the control part 30 retreats the trigger 90T forward by energizing the solenoid actuator 90A (see FIG. 15). Then, when the trigger 90T is detached from the conveyance frame 46, the restriction of the lowering of the conveying unit 40 is released, and the conveying unit 40 is lowered by the gravity acting on the conveying unit 40. When the conveying unit 40 is lowered, the lever 61 is raised and the drying unit 50 is pushed up. When the conveying unit 40 comes into contact with the stop member 91, the lowering of the conveying unit 40 and the lifting of the drying unit 50 are stopped.

Next, the user opens the door 31D of the drying device 126 (see FIG. 1), removes the sheet S stopped in the conveyance path 34, manually pushes up the conveying unit 40, and hooks the trigger 90T to the lower end portion of the conveyance frame 46 (see FIG. 14). Finally, the user closes the door 31D. In addition to the configuration of the sixth modified example, a spring or the like may be provided to bias the trigger 90T rearward. The drying unit biasing part 80 of the first modified example, the damper 82 of the second modified example and the driving part 84 of the third modified example may be provided.

Other Modified Examples

In the above examples, when the stop of conveying of the sheet S is detected by the detection part 36, the control part 30 releases the restriction of lowering of the conveying unit 40 by the restriction mechanism 70. However, the restriction of lowering of the conveying unit 40 may be restricted by retreating the trigger 78T upward manually.

Although the example of drying the ink by radiant heat is shown in the above embodiments, the present invention may be applied to a drying device that dries the ink by heat such as warm air. The present invention may also be applied to a drying device that uses radiant heat in combination with warm air or the like.

In the above embodiment, an example is shown in which the present invention is applied to the drying device 120 in which the conveying unit 40 is provided below and the drying unit 50 is provided above, but the present invention may be applied to a drying device 120 in which the conveying unit 40 is provided above and the drying unit 50 is provided below.

The invention claimed is:

1. A drying device comprising:

a liftable and lowerable conveying unit which conveys a sheet on which ink is ejected, along a conveyance path;

a liftable and lowerable drying unit which faces the conveyance path and dries the ink by heat;

a lifting and lowering mechanism capable of lowering a lower unit, which is a unit provided below among the conveying unit and the drying unit, by gravity acting on the lower unit and lifting an upper unit, which is a unit provided above among the conveying unit and the drying unit, to open the conveyance path; and a restriction mechanism which restricts lowering of the lower unit.

2. The drying device according to claim 1, wherein the lower unit is the conveying unit, and the upper unit is the drying unit.

3. The drying device according to claim 1, wherein the lifting and lowering mechanism includes a lever in which a first end is rockably connected to the lower unit, a second end is slidable against a lower surface of the upper unit, and a fulcrum is provided midway between the first end and the second end.

4. The drying device according to claim 3, wherein when the restriction mechanism releases restriction of the lowering of the lower unit, the lever rotates around the fulcrum to lower the lower unit and to lift the upper unit to open the conveyance path.

5. The drying device according to claim 1, wherein the lower unit and the upper unit are lifted and lowered along an upper-and-lower direction in a horizontal posture.

6. The drying device according to claim 1, wherein the restriction mechanism includes:

an eccentric cam in contact with the lower surface of said lower unit; and a cam restriction mechanism which restricts rocking of the eccentric cam in a state where the lower unit is lifted.

7. The drying device according to claim 1, wherein a mass of the lower unit is greater than a mass of the upper unit.

8. The drying device according to claim 1, comprising a biasing part which biases the upper unit upward.

9. The drying device according to claim 1, further comprising a damper which reduces energy generated when the lower unit is lowered.

10. The drying device according to claim 1, further comprising a stop member which stops the lower unit at a predetermined height when the lower unit is lowered.

11. The drying device according to claim 1, comprising:

a detection part which detects a stop of conveying of the sheet in the conveyance path; and a control part which releases the restriction of lowering of the lower unit by the restriction mechanism when the stop of conveying of the sheet is detected by the detection part.

12. The drying device according to claim 1, wherein the restriction mechanism makes it possible to release the restriction of lowering of the lower unit manually.

13. An image forming system comprising:

an inkjet recording device which ejects ink on a sheet; and the drying device according to claim 1, which dries the ink ejected by the inkjet recording device.

* * * * *